(12) United States Patent
Florendo et al.

(10) Patent No.: US 10,747,737 B2
(45) Date of Patent: Aug. 18, 2020

(54) ALTERING DATA TYPE OF A COLUMN IN A DATABASE

(71) Applicant: SAP SE, Walldorf (DE)

(72) Inventors: Colin Florendo, Marlborough, MA (US); Ivan Schreter, Mannheim (DE); Panfeng Zhou, San Francisco, CA (US); David Wein, Saint Paul, MN (US); Steffen Geissinger, Wiesloch (DE); Michael Muehle, Walldorf (DE)

(73) Assignee: SAP SE, Walldorf (DE)

( * ) Notice: Subject to any disclaimer, the term of this patent is extended or adjusted under 35 U.S.C. 154(b) by 1009 days.

(21) Appl. No.: 14/552,902

(22) Filed: Nov. 25, 2014

(65) Prior Publication Data

US 2016/0147776 A1  May 26, 2016

(51) Int. Cl.
*G06F 17/22* (2006.01)
*G06F 16/22* (2019.01)

(52) U.S. Cl.
CPC .................................. *G06F 16/221* (2019.01)

(58) Field of Classification Search
None
See application file for complete search history.

(56) References Cited

U.S. PATENT DOCUMENTS

| | | | | |
|---|---|---|---|---|
| 2002/0194196 A1* | 12/2002 | Weinberg | .......... | G06F 17/30038 |
| 2006/0190497 A1* | 8/2006 | Inturi | .................... | G06F 16/256 |
| 2012/0109910 A1* | 5/2012 | Netz | ................. | G06F 17/30501 707/693 |
| 2013/0060780 A1* | 3/2013 | Lahiri | ................. | H03M 7/3088 707/741 |
| 2013/0246438 A1* | 9/2013 | Gestrelius | ......... | G06F 17/30324 707/745 |
| 2013/0290282 A1* | 10/2013 | Faerber | ............. | G06F 17/30153 707/693 |
| 2014/0019422 A1* | 1/2014 | Franke | ............. | G06F 17/30076 707/687 |
| 2015/0134670 A1* | 5/2015 | Liu | ........................ | G06F 16/20 707/741 |

* cited by examiner

*Primary Examiner* — Aleksandr Kerzhner
*Assistant Examiner* — Eddy Cheng
(74) *Attorney, Agent, or Firm* — Sterne, Kessler, Goldstein & Fox P.L.L.C.

(57) ABSTRACT

Disclosed herein are system, method, and computer program product embodiments for altering the data type of a column in a database. An embodiment operates by converting an original dictionary associated with a column into a new dictionary. The new dictionary stores the values of the original dictionary using a different data type. An index vector containing the keys of the original dictionary is then updated to contain the associated keys of the new dictionary. Because the size of the original dictionary is often substantially smaller than the number of rows in the associated column, this dictionary conversion decreases the computation cost to the database system of altering the data type of the column and reduces or even minimizes database downtime for users.

12 Claims, 4 Drawing Sheets

ALTERING DATA TYPE OF A COLUMN IN A DATABASE

BACKGROUND

Many database systems can alter the data type of a column in a table. Altering the data type of a column can increase data compression in the database, and enable the database system to more efficiently analyze and manipulate column data. But altering the data type of a column is often compute intensive for the database system. Furthermore, the database system may need exclusive access to a table when altering the data type of a column. This causes the database to be unavailable to users for extended periods of time.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for altering the data type of a column in a database. An embodiment operates by converting an original (or existing) dictionary associated with a column into a new dictionary. The new dictionary stores the values of the original dictionary using a different data type. The column is then associated with the new dictionary. The size of the original dictionary is often substantially smaller than the number of rows in the associated column. Accordingly, this dictionary conversion decreases the computation cost to the database system of altering the data type of a column and reduces or even minimizes database downtime for users.

Figure 1:
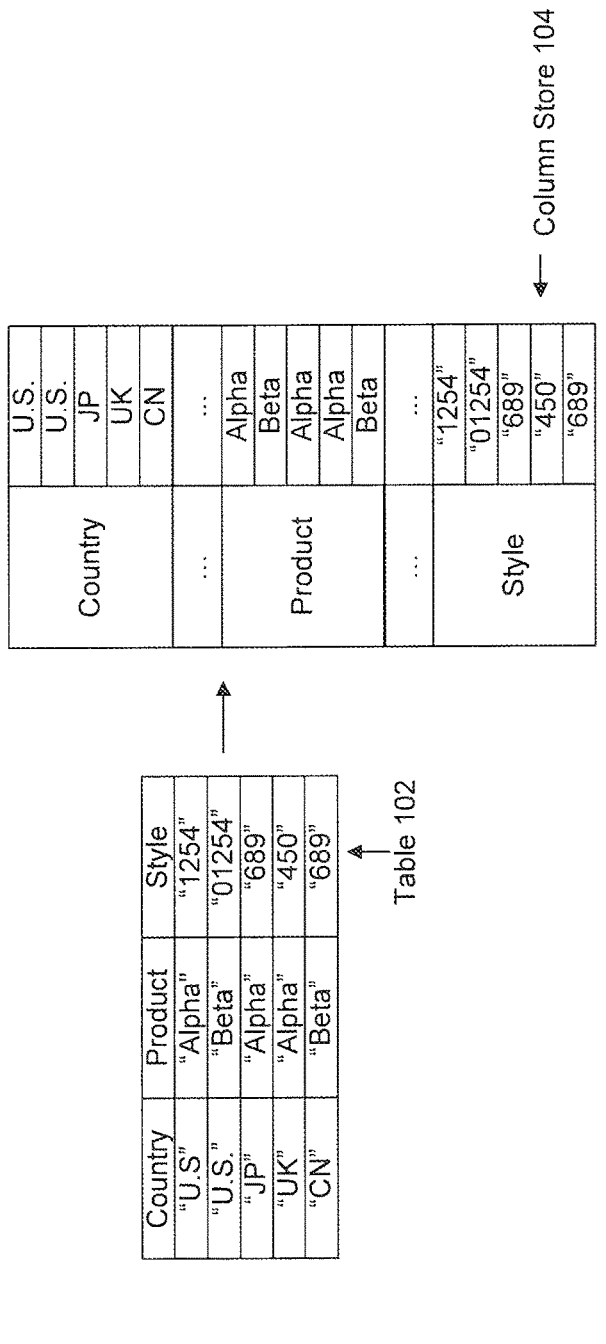
FIG. 1 illustrates a database system that uses column-based storage, according to an example embodiment.

FIG. 1 illustrates a database system that uses column-based storage, according to an example embodiment. FIG. 1 includes table 102. Table 102 is represented using column-based storage as column store 104. In column-based storage, the database system stores data column by column. In contrast, in row-based storage, the database system stores data row by row.

For example, the database system stores the columns of table 102 in contiguous storage locations. For example, the "Country" column is stored first as "U.S.", "U.S.", "JP", "UK", and "CN". The "Product" column is stored second as "Alpha", "Beta", "Alpha", "Alpha", and "Beta". The "Style" column is stored third as "1254", "01254", "689", "450", and "689".

For Online Analytical Processing (OLAP) applications (e.g. data warehousing or business intelligence), database systems that use column-based storage are often faster than database systems that use row-based storage. For example, a database system that uses column-based storage is often faster when performing read intensive operations on a large data repository. This is because a column-oriented database system only needs to scan the relevant columns when performing an operation. In contrast, a row-oriented database system must scan the columns of the rows it is reading. Furthermore, a column-oriented database system often achieves greater data compression than a row-oriented database system.

A column-oriented database system is often chosen where operations may be performed on only a few columns. Similarly, a column-oriented database system may be chosen where a table has a large number of columns, or a table has a large number of rows and column operations are typically performed by the database system.

Another reason a column-oriented database is often faster than a row-oriented database system is because a column-oriented database system may achieve greater data compression than a row-oriented database system. For example, a column-oriented database system may achieve significant data compression where the majority of the columns in the database contain only a few distinct values. A column-oriented database system can achieve this data compression through tokenization or dictionary compression.

In tokenization or dictionary compression, a column may contain many repeated values. For example, a column may contain repeated person names, city names, product numbers, product prices, etc. These repeated values can be replaced by tokens, one per value. The size of the token is just big enough to account for all the unique values, and may be much smaller than the size of the original value.

Tokenization can be used by row-oriented database systems. But tokenization often results in greater data compression when used in column-oriented database systems. For example, when tokenization is block-by-block, a database system may achieve greater data compression if there are more total values from the same column in each block, and this will happen when all the data in a single block comes from the same column.

Figure 2:
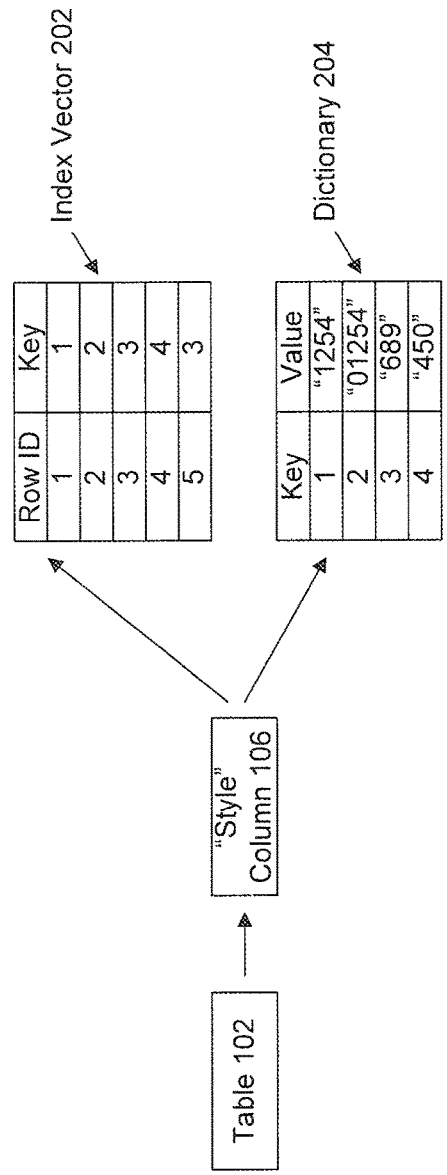
FIG. 2 illustrates a tokenized representation of a database column, according to an example embodiment.

FIG. 2 illustrates a tokenized representation of a database column, according to an example embodiment. FIG. 2 includes table 102 as described above with respect to FIG. 1. Table 102 includes three columns, "Country", "Product", and "Style". "Style" column 106 is compressed using tokenization. A tokenized column may be represented by an index vector and a dictionary. For example, "Style" column 106 is represented by index vector 202 and dictionary 204.

A column may be associated with an index vector using a column descriptor. A column descriptor may be stored with the column. The column descriptor points to the location of the associated index vector.

A column may be associated with a dictionary using a column fragment descriptor. A column fragment descriptor may be stored with the column. The column fragment descriptor points to the location of the associated dictionary.

An index vector contains (row ID, key) pairs. A row ID identifies a row in the column. The key is used to determine the value in a row in the column.

A dictionary contains (key, value) pairs. The key maps a row ID of the index vector to the value in the associated row in the column. Significant data compression can be achieved by representing repeated values in a column using a single key.

For example, instead of storing "689" directly in rows 3 and 5 of "Style" column 106, the key 3 can stored in index vector 202 for rows 3 and 5. The actual value of "689" can then be looked up in dictionary 204. In other words, the key 3 is used to index into dictionary 204. Thus, instead storing "689" twice, a single digit key of 3 is stored twice. This enables the database system to achieve significant data compression where there are many repeated values in a column.

A database system can achieve additional data compression by altering the data type of a column. For example, a "Product Number" column of data type varchar, e.g. "5517", can be changed to data type integer, e.g. 5517. Similarly, a "Subscribed" column of data type varchar, e.g. "Yes", can be changed to data type boolean, e.g. True.

Moreover, altering the data type of a column often enables a database system to analyze and manipulate the column data more efficiently. For example, if a "Salary" column of data type varchar, e.g. "55,000", is changed to data type integer, e.g. 55000, the database system can perform a summation of all the "Salary" column values.

In an embodiment, the conversion of a value from one data type to another is database system specific. In addition, an accurate conversion often depends on whether a database system user determined whether the value could be represented in the new data type.

In an example embodiment, the data type of a column can be altered by a database system using an export/import process. First, the column is detokenized if necessary. Specifically, for each row in the column, the database system combines the index vector and the dictionary of the column using the associated key. For example, in FIG. 2, row ID 3 in index vector 202 is combined with value "689" in dictionary 204 using key 3. Similarly, row ID 5 is combined with value "689" using key 3. This detokenization process produces a list of values, one for each row in the column. For example, in FIG. 2, the detokenization of "Style" column 106 in table 102 will produce the list of (Row ID, Value) pairs of (1, "1254"), (2, "01254"), (3, "689"), (4, "450"), and (5, "689").

This detokenization process essentially uncompresses the column. Moreover, the entire column is detokenized before altering the data type of the column. This is because all values in a database column have the same data type.

The detokenized list of values may be stored in memory. But if the detokenized list of values is too big to be stored in memory, it may be exported to secondary storage, e.g. a hard disk drive, tape library, or network attached storage (NAS). The detokenized list of values is often exported to secondary storage because the associated column often contains millions of rows.

After the column is detokenized, and if necessary exported, the database system alters the data type of the column. The database system then imports the detokenized list of values into the column using the new data type. Specifically, for each row in the column, the associated value in the detokenized list is converted to the new data type. The converted value is then inserted into the associated row by the database system.

For example, in FIG. 2. "Style" column 106 is detokenized to the list of (Row ID, Value) pairs of (1, "1254"), (2, "01254"), (3, "689"), (4, "450"), and (5, "689"). Each value in this detokenized list is of data type varchar. If "Style" column 106 is to be converted to data type integer, each varchar value in the detokenized list is converted to an integer value by the database system. For example, the varchar value of "1254" would be converted by the database system to an integer value of 1254. Each row of "Style" column 106 is then updated by the database system with the corresponding integer value. This update process is database system specific.

Because many database systems contain columns with millions of rows, performing this data conversion and importation process is often compute intensive for the database system and expensive in terms of storage space. This is because a column is detokenized into uncompressed form prior to the data conversion and importation process being performed by the database system. Moreover, because the database system may perform this export/import process slowly, the associated column and table is often inaccessible to database users. This unavailability of the database system results in user dissatisfaction. It also costs users and businesses money because the database system is unable to be handle database transactions. Accordingly, there is a need for a more computationally efficient process for altering the data type of a column in a database.

Figure 3:
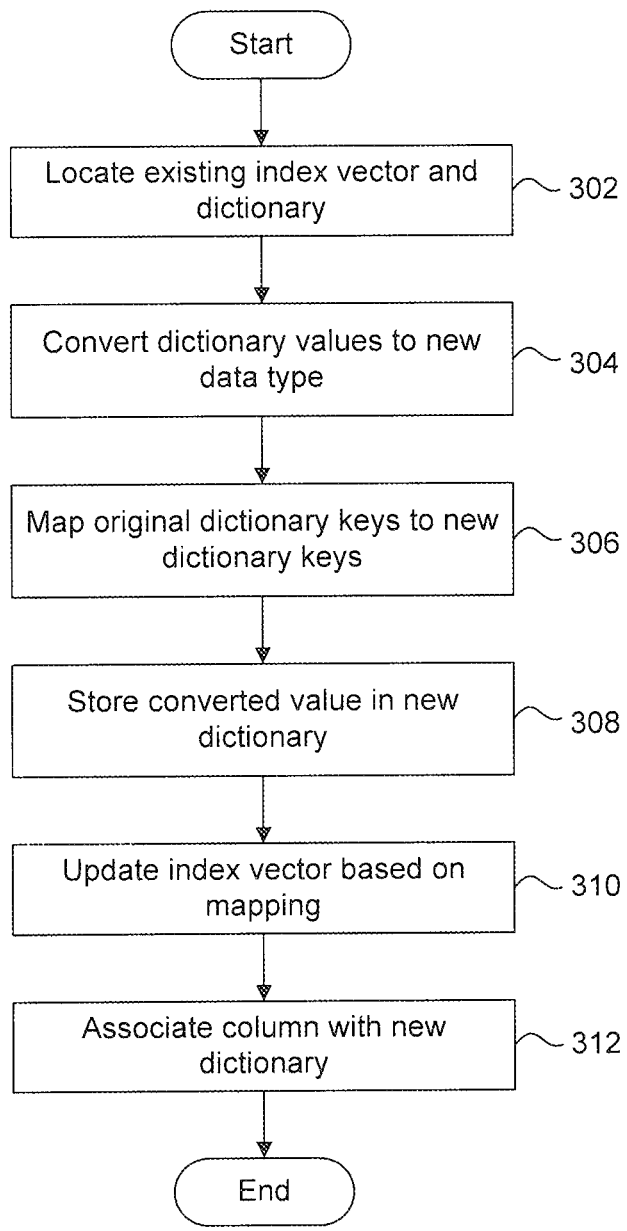
FIG. 3 is a flowchart illustrating a process for altering the data type of a column in a database, according to an example embodiment.

FIG. 3 is a flowchart for a method 300 for altering a data type of a column in a database, according to an embodiment. Method 300 involves converting an original dictionary associated with the column into a new dictionary. Method 300 can be performed by processing logic that can comprise hardware (e.g., circuitry, dedicated logic, programmable logic, microcode, etc.), software (e.g., instructions run on a processing device), or a combination thereof. Method 300 is described with reference to FIG. 4.

Figure 4:
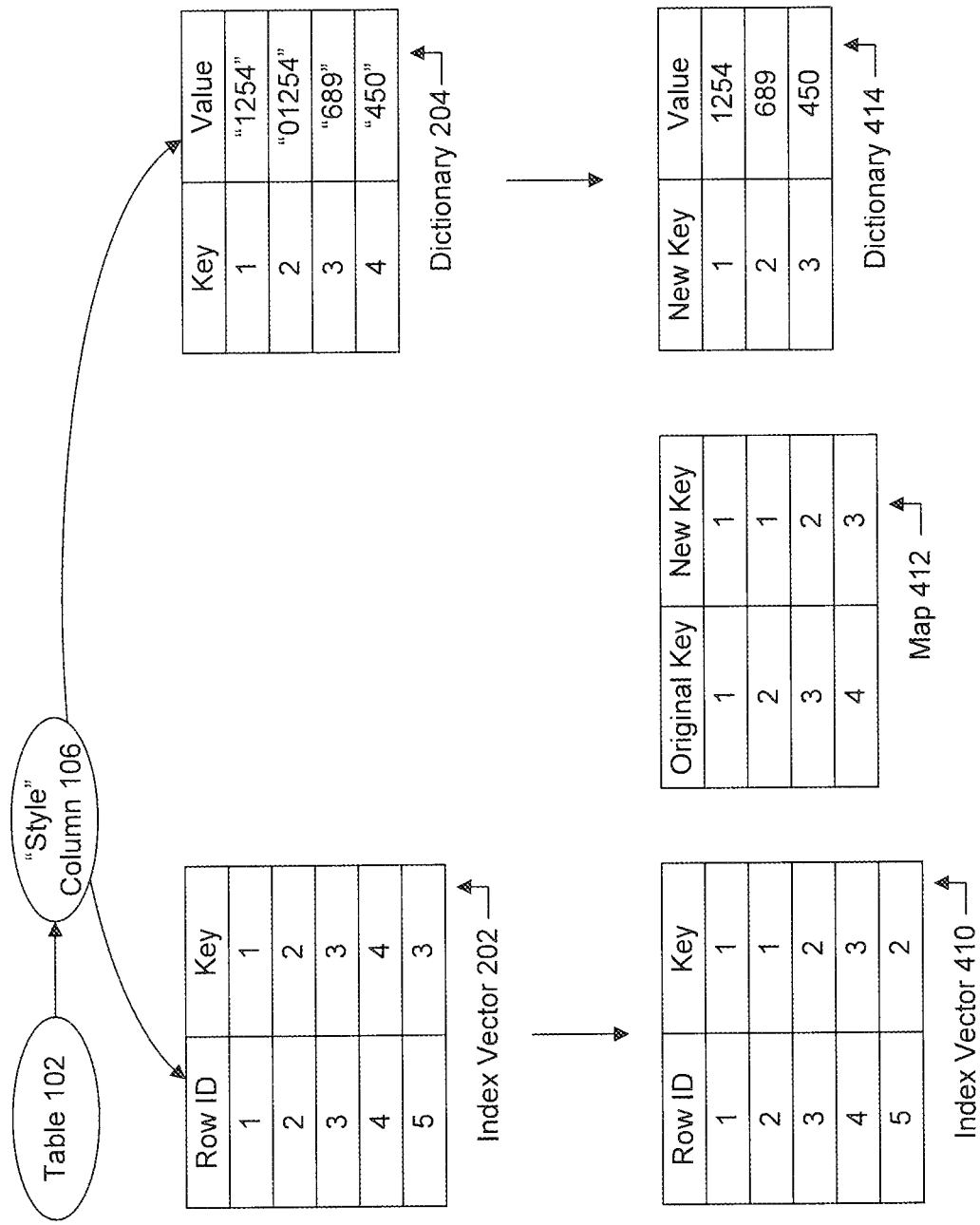
FIG. 4 illustrates an example of altering the data type of a column in a database, according to the example embodiment described in FIG. 3.

FIG. 4 illustrates an example of altering the data type of a column in a database, according to the example embodiment described in FIG. 3. Specifically, FIG. 4 includes table 102, index vector 202, and dictionary 204 from FIGS. 1 and 2. FIG. 4 illustrates converting "Style" column 106 from table 102 from a varchar data type to an integer data type.

In step 302 of FIG. 3, the database system identifies the index vector and dictionary associated with the column to be converted to a different data type. In an embodiment, this may be done by reading both the column descriptor and column fragment descriptor associated with the column. A column descriptor enables the database system to locate the index vector associated with the column in memory or storage. A column fragment descriptor enables the database system to locate the dictionary associated with the column in memory or storage. For example, in FIG. 4, the database system identifies index vector 202 and dictionary 204 as associated with "Style" column 106 of table 102.

In step 304, the database system converts the values in the dictionary associated with the column to the new data type. Specifically, for each key in the dictionary, the corresponding value is converted to the new data type. For example, in FIG. 4, the database system converts the varchar value of "01254" to the integer value of 1254 for key 2 in dictionary 204.

In step 306, the database system maps each key in the dictionary to a new key in a new dictionary based on the conversion in step 304. In an embodiment, this mapping may be stored for later use. For example, in FIG. 4, the database system creates map 412. In an embodiment, the new dictionary may be a modified version of the original dictionary. In another embodiment, the database system creates an entirely new dictionary. The new dictionary may be created during step 306. Alternatively, the new dictionary may be created at a different step as understood by a person of ordinary skill in the art.

The database system may map a key in the original dictionary to a different key in the new dictionary. This may occur when two or more different values in the original dictionary are converted in step 304 to the same value in the new dictionary. For example, in FIG. 4, the database system converts both varchar values "1254" and "01254" in dictionary 204 to integer value 1254. Accordingly, keys 1 and 2 in dictionary 204 are mapped to new key 1 in dictionary 414.

In step 308, the database system stores the converted values of step 304 in the new dictionary. For example, in FIG. 4, the database system stores the varchar values of "1254" and "01254" in dictionary 414 using the same new key 1. As would be appreciated by a person of ordinary skill in the art, a dictionary may be implemented using various data structures, e.g. a hash table, skip list, or binary search tree. Moreover, in an embodiment, dictionary 414 may detect the insertion of duplicate values.

In step 310, the database system updates the index vector associated with the column to be converted to a different data type based on the mapping performed in step 306. In an embodiment, the database system changes each key in the index vector to the corresponding new key in the new dictionary. For example, in FIG. 4, the database system updates the keys in index vector 202 from 1, 2, 3, 4, 3 to 1, 1, 2, 3, 2, respectively. This results in index vector 410. In an embodiment, the database system creates a new index vector based on the mapping performed in step 306. In an embodiment, the database system performs step 310 based on the stored map created in step 306.

Finally, in step 312, the database system associates the column to be converted to a different data type with the new dictionary. In an embodiment, the database system modifies the column fragment descriptor associated with the column to point to the location of the new dictionary in memory or storage. For example, in FIG. 4, the database system associates "Style" column 106 with dictionary 414.

Because a dictionary associated with a column to be converted to a different data type often contains significantly fewer entries than a detokenized list of values, method 300 is often significantly faster and more space efficient than the export/import process described above. This significantly reduces database downtime when the database system alters the data type of a column. This increases user satisfaction with the database system and decreases the costs associated with the database system being unavailable. In addition, this may decrease the purchase cost of a database system because less memory and storage space is potentially needed.

Figure 5:
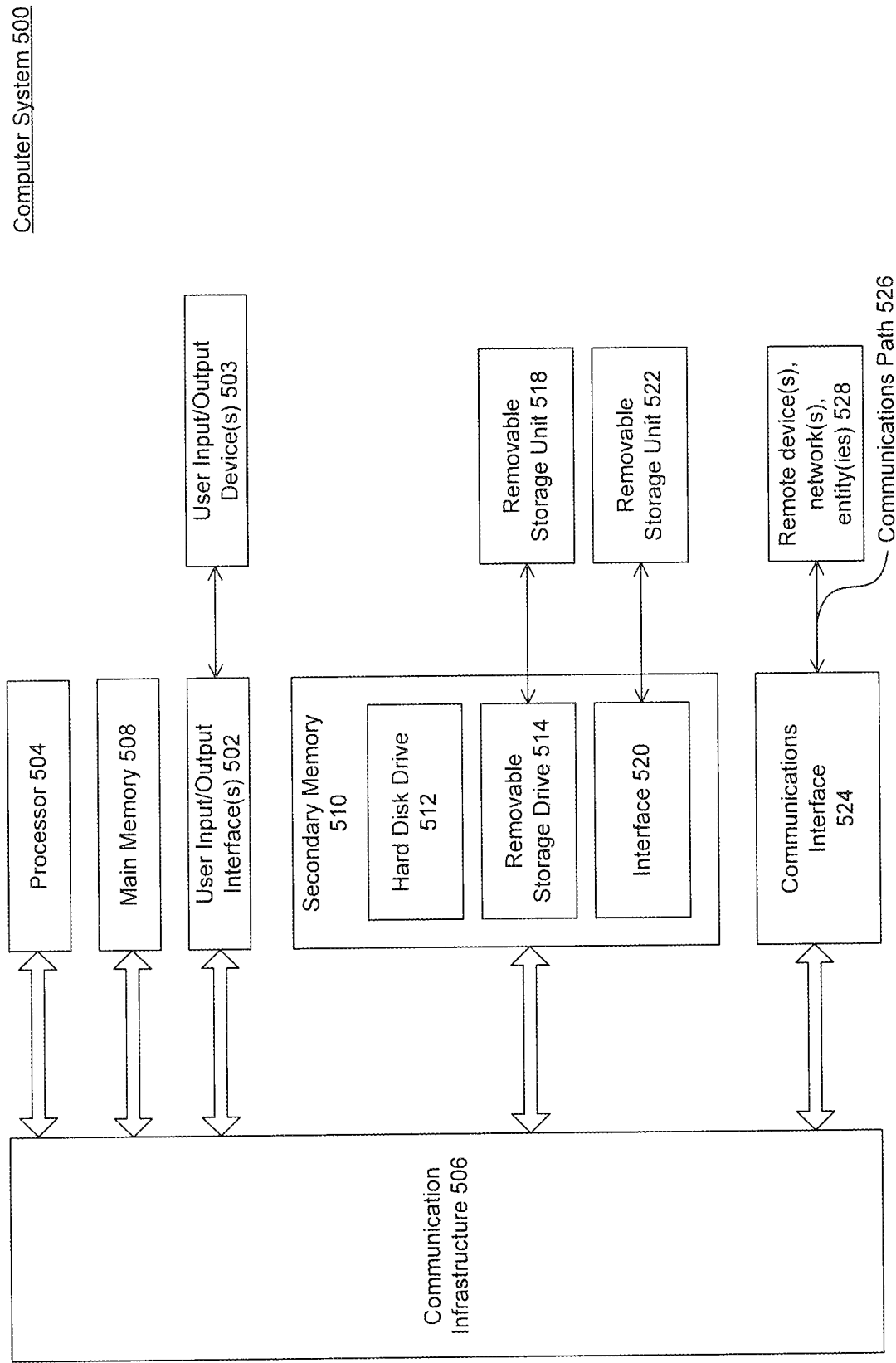
FIG. 5 is an example computer system useful for implementing various embodiments.

Various embodiments can be implemented, for example, using one or more well-known computer systems, such as computer system 500 shown in FIG. 5. Computer system 500 can be any well-known computer capable of performing the functions described herein.

Computer system 5 includes one or more processors (also called central processing units, or CPUs), such as a processor 5. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for altering a column of a table in a database from a first data type to a second data type, comprising:

identifying, by at least one processor, an index vector and a first dictionary representing values in the column of the table in the database, wherein the first dictionary is configured to store the values in the column of the table in the database using the first data type;

creating, by the at least one processor, a second dictionary, wherein the second dictionary is configured to store the values in the column of the table in the database using the second data type, and the first data type of the first dictionary is different than the second data type of the second dictionary;

converting, by the at least one processor, the values in the first dictionary from the first data type to the second data type of the second dictionary, wherein the converting further comprises converting two or more different values in the first dictionary to a same value of the second data type of the second dictionary;

mapping, by the at least one processor, keys in the first dictionary to keys in the second dictionary based on the converting, wherein the mapping further comprises mapping keys corresponding to the two or more different values in the first dictionary to a single key in the second dictionary based on the converting;

storing, by the at least one processor, the converted values from the first dictionary into the second dictionary based on the mapping, wherein the storing further comprises storing the same value in the second dictionary using the single key in the second dictionary;

updating, by the at least one processor, keys in the index vector that correspond to the keys corresponding to the two or more different values in the first dictionary to be the single key in the second dictionary; and modifying, by the at least one processor, a column fragment descriptor associated with the column of the table in the database to point a location of the second dictionary in a memory.

2. The method of claim 1, the mapping further comprising:

creating, by the at least one processor, a map between the keys in the first dictionary and the keys in the second dictionary.

3. The method of claim 2, the updating comprising:

updating the keys in the index vector based on the created map.

4. The method of claim 1, wherein a size of a key in the first dictionary is based at least in part on a number of unique values for the column of the table in the database.

5. A system, comprising:

a memory; and at least one processor coupled to the memory and configured to:

identify an index vector and a first dictionary representing values in a column of a table in a database, wherein the first dictionary is configured to store the values in the column of the table in the database using the first data type;

create a second dictionary, wherein the second dictionary is configured to store the values in the column of the table in the database using a second data type, and the first data type of the first dictionary is different than the second data type of the second dictionary;

convert the values in the first dictionary from the first data type to the second data type of the second dictionary, wherein to convert the processor is further configured to convert two or more different values in the first dictionary to a same value of the second data type of the second dictionary;

map keys in the first dictionary to keys in the second dictionary based on the conversion, wherein to map the processor is further configured to map keys corresponding to the two or more different values in the first dictionary to a single key in the second dictionary based on the converting;

store the converted values from the first dictionary into the second dictionary based on the mapping, wherein to store the processor is further configured to store the same value in the second dictionary using the single key in the second dictionary;

update keys in the index vector that correspond to the keys corresponding to the two or more different values in the first dictionary to be the single key in the second dictionary; and modify a column fragment descriptor associated with the column of the table in the database to point a location of the second dictionary in a memory.

6. The system of claim 5, wherein the at least one processor is further configured to:

create a map between the keys in the first dictionary and the keys in the second dictionary.

7. The system of claim 6, wherein to update the at least one processor is further configured to:

update the keys in the index vector based on the created map.

8. The system of claim 5, wherein a size of a key in the first dictionary is based at least in part on a number of unique values for the column of the table in the database.

9. A non-transitory computer-readable device having instructions stored thereon that, when executed by at least one computing device, causes the at least one computing device to perform operations comprising:

identifying an index vector and a first dictionary representing values in a column of a table in a database, wherein the first dictionary is configured to store the values in the column of the table in the database using a first data type;

creating a second dictionary, wherein the second dictionary is configured to store the values in the column of the table in the database using the second data type, and the first data type of the first dictionary is different than the second data type of the second dictionary;

converting the values in the first dictionary from the first data type to the second data type of the second dictionary, wherein the converting further comprises converting two or more different values in the first dictionary to a same value of the second data type of the second dictionary;

mapping keys in the first dictionary to keys in the second dictionary based on the converting, wherein the mapping further comprises mapping keys corresponding to the two or more different values in the first dictionary to a single key in the second dictionary based on the converting;

storing the converted values from the first dictionary into the second dictionary based on the mapping, wherein the storing further comprises storing the same value in the second dictionary using the single key in the second dictionary;

updating keys in the index vector that correspond to the keys corresponding to the two or more different values in the first dictionary to be the single key in the second dictionary; and modifying a column fragment descriptor associated with the column of the table in the database to point a location of the second dictionary in a memory.

10. The non-transitory computer-readable device of claim 9, the operations further comprising:

creating a map between the keys in the first dictionary and the keys in the second dictionary.

11. The non-transitory computer-readable device of claim 10, the updating comprising: updating the keys in the index vector based on the created map.

12. The non-transitory computer-readable device of claim 9, wherein a size of a key in the first dictionary is based at least in part on a number of unique values for the column of the table in the database.

* * * * *